United States Patent Office 3,238,014
Patented Mar. 1, 1966

3,238,014
RECOVERY OF URANIUM AND PLUTONIUM VALUES FROM AQUEOUS SOLUTIONS OF AMMONIUM FLUORIDE
Theodore A. Gens, Oak Ridge, Tenn., assignor to the United States of America as represented by the United States Atomic Energy Commission
No Drawing. Filed July 6, 1964, Ser. No. 380,719
4 Claims. (Cl. 23—14.5)

The invention described herein was made in the course of, or under, a contract with the U.S. Atomic Energy Commission.

The present invention relates to the selective and quantitative precipitation of uranium values from aqueous solutions of ammonium fluoride. More particularly, this invention is directed to the recovery of uranium and/or plutonium dissolved in Zirflex-type waste solutions. A Zirflex solution is an aqueous solution of generally a 4–6 molar ammonium fluoride, alone, or in admixture with ammonium nitrate, said solution being designed to accomplish selective dissolution of zirconium from nuclear fuels containing zirconium and uranium. The Zirflex process is applied, for example, to the selective dissolution of zirconium or Zircaloy (a zirconium-base alloy containing 1.5% tin, 0.15% iron, 0.1% chromium and 0.05% nickel) cladding of reactor fuels, in which the fuel is uranium oxide. In another case, the zirconium is selectively dissolved from zirconium-uranium alloys. A comprehensive discussion of the Zirflex process is given in a paper by J. L. Swanson, entitled, "The Zirflex Process," which appears in the Proceedings of the International Conference on the Peaceful Uses of Atomic Energy, Geneva 17, 155 (1958).

Separation of zirconium from uranium in the Zirflex process apparently takes place by the oxidation of zirconium to a soluble oxidation state, while the uranium is oxidized to the +4 oxidation state to form a sparingly soluble ammonium fluoride, $NH_4UF_5$. The zirconium-containing solution resulting from the dissolution of zirconium-uranium fuel elements is termed "the Zirflex-type waste solution," and this invention will be discussed and demonstrated in terms of recovering the dissolved uranium values from such a solution.

While the major portion of the uranium in contact with an ammonium fluoride Zirflex dissolvent solution will be precipitated in the form of a sparingly soluble fluoride salt, the uranium loss to the Zirflex waste solution still represents a significant amount of uranium, especially in cases where the uranium is enriched in its U–235 content. The uranium loss to the Zirflex waste solution apparently comes about in several ways. Some workers have understood that some of the uranium is oxidized to the +6 oxidation state existing as a very soluble uranyl fluoride form. Hence, the conditions of zirconium dissolution must be controlled to restrict the oxidation of zirconium to no higher than the +4 oxidation state. However, the dissolution conditions cannot be maintained in most cases so rigidly as to eliminate the presence of air or metal catalysts or the effect of radiation, each of which singly, or in combination, may serve as an oxidation medium to convert at least a portion of the uranium to the soluble +6 oxidation state. Another apparent source of uranium loss is caused by the limited, but nevertheless discrete, solubility of uranium (+4) fluoride. A particular source of loss comes about from the enhanced uranium (+4) fluoride solubility in ammonium fluoride solutions having a high free fluoride content where the free fluoride concentration is defined as being equal to the total fluoride concentration minus 6 times the zirconium concentration. While an excess free fluoride concentration solution is desirable toward effecting rapid dissolution of zirconium, it also adversely enhances uranium solubility. Thus, under conditions prior to this invention, the choice of dissolution conditions was limited by the rather appreciable uranium solubility at the high free fluoride concentration.

The loss of plutonium to the Zirflex decladding solution is somewhat less than the uranium loss. However, the average uranium plutonium loss is of such magnitude as to warrant its recovery from these decladding solutions if the economics of a recovery process would be warranted. It is, therefore, the principal object of this invention to provide a simple and economically feasible process for recovering uranium and/or plutonium values from decladding solutions comprising an aqueous solution of ammonium fluoride containing said values and including zirconium values. A particular object of this invention is to recover uranium and/or plutonium values from Zirflex-type waste solutions. Another object of this invention is to provide a process for recovering uranium compositions of low fluoride content from uranium compositions containing compounds of fluoride, zirconium and uranium. A further object of this invention is to provide a process for the precipitation of a peroxide, selected from uranium and plutonium, from a fluoride solution containing said metals and zirconium under such conditions as to avoid the co-precipitation of zirconium compounds with the peroxide precipitate.

The objects of this invention are realized by the addition of a peroxide to an aqueous solution of ammonium fluoride containing zirconium and a metal selected from uranium and plutonium, wherein the concentration of the selected metal in said solution is no more than would be completely precipitated as its peroxide prior to co-precipitation of zirconium. Thus, where uranium and zirconium are in solution, the uranium will be selectively and quantitatively precipitated by the peroxide precipitant, in a solution having uranium concentration no greater than about 0.001 M. The resulting peroxide precipitate, which consists of a hydrated form of uranium peroxide, $$UO_4 \cdot 4H_2O$$

as identified by X-ray diffraction analysis, can be cleanly separated by filtration, decantation, centrifugation or other similar solid-liquid separatory techniques. The precipitation of the uranium takes place over a period of time depending upon the concentration of uranium, zirconium and free fluoride in solution. Thus, for example, it has been found that a solution 6 molar in fluoride, 0.8 molar in zirconium, and 0.0001 molar uranium will require about 48 hours to effect substantially complete uranium precipitation, while a solution 3.5 molar fluoride, 0.4 molar zirconium and 0.001 molar uranium requires about 140 hours for substantially complete uranium precipitation. The process of this invention will effect substantially complete selective precipitation of uranium values from any Zirflex solution so long as the uranium concentration does not exceed more than about 0.001 molar. If more uranium is present, the zirconium will begin to co-precipitate before all of the uranium peroxide has precipitated. The precipitation temperature is not critical so long as the decomposition temperature of the peroxide precipitant is not exceeded. Normally, precipitation occurs at room temperature, i.e., 25° C., and no greater than about 60° C. The concentration of peroxide precipitant maintained in solution may vary from as low as 0.1 molar to in excess of 1 molar where the peroxide is preferably hydrogen peroxide. The optimum peroxide and peroxide concentration which should be maintained for most purposes to effect a selective and quantitative precipitation of uranium will be a 1 molar solution of hydrogen peroxide. Such a solution is obtained generally by the addition of a concentrated hydrogen peroxide solution, say 30% hydrogen peroxide, added to the Zirflex solution to be treated until a 1 molar peroxide concentration in said Zirflex solution is reached.

Having described the invention in general terms, together with the significant process parameters needed to effect the desired result, reference will now be made to specific experiments which indicate the manner in which the invention may be carried out.

*Example I*

Several experiments were performed in which zirconium-uranium alloys having 1 to 3% uranium were completely dissolved in an approximately 6 M $NH_4F$ dissolvent, after which the resultant zirconium-uranium solutions were made 1 to 3 molar in hydrogen peroxide, and set aside at 0° C., and at 25° C., for a period of about 1 week. The experiments were interrupted after one week to avoid co-precipitation of zirconium compounds which starts after about one week. In all cases, it was found that the amount of uranium peroxide which had precipitated was less than, or equivalent to 0.001 M U in the dissolvent.

*Example II*

Two sintered pellets of $UO_2$ of identical size, shape and density were treated in the following manner:

The first pellet was immersed for one hour in 100 milliliters of refluxing 6 molar ammonium fluoride (aqueous) solution. The resultant solution was cooled to room temperature, analyzed and found to contain 1.4% of the uranium originally in the pellet. Enough 30% $H_2O_2$ was added to make the solution 1 molar in $H_2O_2$. After standing for 72 hours, substantially all of the uranium had precipitated and was recovered as uranium peroxide. The filtrate contained only $3 \times 10^{-5}$ percent of the uranium originally in the pellet.

The second sintered pellet was also immersed for 1 hour in another volume of 100 milliliters of refluxing ammonium fluoride solution and cooled to room temperature. In this case, too, it was found that 1.4% of the original uranium of the pellet was lost to the solution. This latter solution was allowed to stand for 72 hours and it was found that the solution still contained 0.9% of the uranium originally in the pellet, or about 0.0001 molar uranium; the remaining 0.5% had precipitated as $NH_4UF_5$.

*Example III*

A run similar to Example II using hydrogen peroxide was made in which the 6 molar $NH_4F$ contained 0.8 molar zirconium as dissolved Zircaloy-2. In this case, the pellet lost only 0.01% of its uranium content to the solution, since much of the fluoride in the 6 molar $NH_4F$ solution was now complexed by zirconium. After the solution stood for 2 days at 25° C., a quantity of uranium equal to the pellet weight loss was recovered as insoluble uranium peroxide. X-ray analysis indicated the precipitate was $UO_4 \cdot 4H_2O$.

It will thus be seen that I have provided a method for recovering uranium as uranium peroxide or tetroxide from ammonium fluoride solutions designed to selectively declad or dissolve zirconium values. The advantages accruing from this invention have been illustrated in connection with the recovery of uranium from Zirflex waste solutions formed by the dissolution of zirconium clad nuclear fuels or zirconium-uranium fuel elements. The same process can be used to recover soluble plutonium values from such solutions. Moreover, it will be equally clear that the process is equally applicable with the same resultant advantages accruing whenever this invention is applied to any other source of zirconium and uranium where the ultimate object is to refine the zirconium-uranium source in such a way as to recover the uranium and/or plutonium which may be present in a simple uncomplicated manner. Thus, while several particular embodiments of this invention have been shown in the examples, it will be understood that the invention is not to be limited thereto since the advantages of this invention will accrue when applied to any zirconium-uranium source dissolved in an ammonium fluoride solution, so long as the uranium content does not exceed the amount of uranium which will be substantially completely precipitated before any zirconium precipitation occurs.

Having thus described my invention, I claim:

1. A process for recovering a metal selected from uranium and plutonium from an aqueous ammonium fluoride solution having a pH of at least about 6 and containing said selected metal and zirconium, which comprises adding a soluble peroxide to such said solution as contains said selected metal at a concentration at which selective precipitation of the selected metal, as an insoluble peroxide, will occur.

2. A process for recovering uranium from an aqueous ammonium fluoride solution containing uranium and zirconium and having a pH of at least about 6, which comprises adding a soluble peroxide to such said solution as contains as much uranium as will precipitate substantially completely as an insoluble peroxide prior to any zirconium precipitation.

3. The process according to claim 2 wherein the amount of added peroxide is sufficient to make the solution being treated at least 1 molar in peroxide.

4. The process according to claim 2 wherein the peroxide is hydrogen peroxide.

References Cited by the Examiner

UNITED STATES PATENTS

| | | | |
|---|---|---|---|
| 2,780,515 | 2/1957 | Miller et al. | 23—14.5 |
| 2,847,277 | 8/1958 | King et al. | 23—14.5 |
| 2,852,336 | 9/1958 | Seaborg et al. | 23—14.5 |
| 2,873,169 | 2/1959 | Seaborg et al. | 23—14.5 |
| 3,093,452 | 6/1963 | Newby | 24—14.5 |

FOREIGN PATENTS 544,619  3/1958  Canada.

References Cited by the Applicant

UNITED STATES PATENTS

| | | |
|---|---|---|
| 2,733,127 | 1/1956 | Spiezler. |
| 2,906,598 | 9/1959 | Googin. |
| 2,992,886 | 7/1961 | Gens. |

OTHER REFERENCES

J. L. Swanson: "The Zirflex Process," Proc. 2nd Intern. Conference Peaceful Uses Atomic Energy, Geneva 17, 155 (1958).

L. J. Brady, C. D. Susano, and C. E. Larson: Chemical and Physical Properties of Uranium Peroxide, Y-169; AECD-2366 (May 1948).

D. W. Mogg: Factors Effecting the Precipitation of Uranium Peroxide, Paper 5 in Manhattan Project Technical Series, Electromagnetic Separation Process, book three, CEW-TEC H-1.740.8 (April 1947).

J.M. Googin: The Flocculation and Filtration of the Uranium Peroxide Precipitate, Paper 6 in Manhattan Project Technical Series, Electromagnetic Separation Process, book three, CEW-TEC H-1.740.8 (April 1947).

LEON D. ROSDOL, *Primary Examiner.*

REUBEN EPSTEIN, *Examiner.*

M. J. SCOLNICK, *Assistant Examiner.*